US009880844B2

(12) United States Patent
Tran et al.

(10) Patent No.: US 9,880,844 B2
(45) Date of Patent: Jan. 30, 2018

(54) METHOD AND APPARATUS FOR PARALLEL AND CONDITIONAL DATA MANIPULATION IN A SOFTWARE-DEFINED NETWORK PROCESSING ENGINE

(71) Applicant: CAVIUM, INC., San Jose, CA (US)

(72) Inventors: Anh T. Tran, Santa Clara, CA (US);
Gerald Schmidt, San Jose, CA (US);
Tsahi Daniel, Palo Alto, CA (US);
Mohan Balan, Santa Clara, CA (US)

(73) Assignee: CAVIUM, INC., San Jose, CA (US)

( * ) Notice: Subject to any disclaimer, the term of this patent is extended or adjusted under 35 U.S.C. 154(b) by 303 days.

(21) Appl. No.: 14/144,260

(22) Filed: Dec. 30, 2013

(65) Prior Publication Data
US 2015/0186143 A1    Jul. 2, 2015

(51) Int. Cl.
G06F 9/30 (2006.01)
H04L 29/06 (2006.01)
G06F 15/76 (2006.01)

(52) U.S. Cl.
CPC ............ *G06F 9/30145* (2013.01); *G06F 9/30* (2013.01); *H04L 29/0621* (2013.01); *G06F 15/76* (2013.01); *H04L 69/12* (2013.01)

(58) Field of Classification Search
CPC ............... H04L 49/90; H04L 49/3009; H04L 29/06095; H04L 29/0653; H04L 69/22;
(Continued)

(56) References Cited

U.S. PATENT DOCUMENTS

| 4,929,939 A | * | 5/1990 | Varma | ................... H04L 12/00 340/2.24 |
| 5,319,347 A | * | 6/1994 | McClure | ................. G06F 7/026 327/77 |

(Continued)

FOREIGN PATENT DOCUMENTS

EP    1553738 A1 *    7/2005    ............. H04L 47/10

OTHER PUBLICATIONS

Altera, "White Paper", Jul. 2006, pp. 1-9.*
(Continued)

*Primary Examiner* — Aimee Li
*Assistant Examiner* — Courtney P Carmichael-Moody
(74) *Attorney, Agent, or Firm* — Haverstock & Owens LLP

(57) ABSTRACT

Embodiments of the present invention relate to fast and conditional data modification and generation in a software-defined network (SDN) processing engine. Modification of multiple inputs and generation of multiple outputs can be performed in parallel. A size of each input or output data can be large, such as in hundreds of bytes. The processing engine includes a control path and a data path. The control path generates instructions for modifying inputs and generating new outputs. The data path executes all instructions produced by the control path. The processing engine is typically programmable such that conditions and rules for data modification and generation can be reconfigured depending on network features and protocols supported by the processing engine. The SDN processing engine allows for processing multiple large-size data flows and is efficient in manipulating such data. The SDN processing engine achieves full throughput with multiple back-to-back input and output data flows.

33 Claims, 7 Drawing Sheets

(58) Field of Classification Search
CPC ........... H04L 29/0621; H04L 2209/122; H04L 69/12; G06F 17/30864; G06F 17/30; G06F 9/30181; G06F 9/30196; G06F 15/76
USPC ........................................................ 712/201
See application file for complete search history.

(56) References Cited

U.S. PATENT DOCUMENTS

| | | |
|---|---|---|
| 6,667,984 B1 | 12/2003 | Chao et al. |
| 6,831,917 B1 | 12/2004 | Cheriton |
| 7,461,167 B1 | 12/2008 | Park |
| 8,054,744 B1 | 11/2011 | Bishara et al. |
| 9,159,420 B1 | 10/2015 | Wohlgemuth |
| 9,331,939 B2 | 5/2016 | Thomas et al. |
| 9,590,914 B2 | 3/2017 | Alizadeh Attar et al. |
| 2002/0009076 A1 | 1/2002 | Engbersen |
| 2005/0076228 A1 | 4/2005 | Davis |
| 2006/0045074 A1 | 3/2006 | Lee |
| 2006/0059269 A1 | 3/2006 | Chen et al. |
| 2008/0141023 A1 | 6/2008 | Qi |
| 2009/0028045 A1 | 1/2009 | Stellenberg et al. |
| 2013/0163475 A1 | 6/2013 | Beliveau |
| 2014/0153443 A1 | 6/2014 | Carter |
| 2014/0241353 A1* | 8/2014 | Zhang ................... H04L 45/74 370/390 |
| 2015/0156288 A1* | 6/2015 | Lu .......................... H04L 69/22 370/392 |
| 2016/0197852 A1 | 7/2016 | Hutchison et al. |

OTHER PUBLICATIONS

Pat Bosshart, "Forwarding Metamorphosis: Fast Programmable Match-Action Processing in Hardware for SDN", Aug. 12, 2013, ACM, pp. 99-109.*

Charles Price, "MIPS IV Instruction Set", Sep. 1995, MIPS, pp. A-28-A-29 & A-105-A106.*

Glen Gibb, "Reconfigurable Hardware for software-defined networks", Nov. 2013, Standford University.*

* cited by examiner

METHOD AND APPARATUS FOR PARALLEL AND CONDITIONAL DATA MANIPULATION IN A SOFTWARE-DEFINED NETWORK PROCESSING ENGINE

FIELD OF INVENTION

The present invention relates to the manipulation of multiple data flows in a software-defined network processing engine. More particularly, the present invention relates to method and apparatus for parallel and conditional data manipulation in a software-defined network processing engine.

BACKGROUND OF THE INVENTION

Software-defined networking (SDN) technology allows for fast and easy adaptation of a network to new standards, protocols and services. SDN separates the network abstract into two separate planes: a control plane and a data transfer plane. This separation allows network operators to quickly change features of and/or add new features to the network by configuring/programming the control plane while reusing the expensive existing data transfer plane. SDN is able to reduce cost and time in deploying new network features and services. The plane-separated networking infrastructure is also able to simplify management tasks for network operators.

Each SDN device is often required to process multiple high-throughput data flows in parallel. In such a SDN device, there are one or more processing engines which are responsible for manipulating the data. Data manipulation in these processing engines depends on the data's contents themselves and the network features which are configured for the SDN device. The data processed by these processing engines can be in large sizes which can be up to hundreds of bytes each.

The prior art ASIC-based designs do not provide enough flexibility for reprogramming and/or reconfiguring to perform different network features as expected in a SDN processing engine. Otherwise, using state-of-the-art 64-bit general-purpose CPUs for implementing these engines cannot satisfy the network bandwidth and latency requirement of SDN devices which are required to process hundreds of data bytes per cycle. Other prior art implementations using FPGAs are also not appropriate for performing complex network protocols at high throughput due to their limitations in logic cell capacity and the high complexity in their internal interconnect wirings which make FPGA chips running at low frequency with high latency.

BRIEF SUMMARY OF THE INVENTION

A software-defined networking (SDN) processing engine is proposed for parallel and conditional data manipulation. Users are able to program conditions and rules for data processing according to features and protocols which they want the SDN processing engine to support. The SDN processing engine can process, in parallel, multiple inputs and outputs at full throughput. The SDN processing engine includes two paths: a control path and a data path. The control path includes a Control Bits Extractor, a Word Comparing Cone, a multi-stage MUX/LUT Logic Cone and Instruction Tables. The control path is configured to examine whether the inputs satisfy some specific conditions of the configured network features. Based on the examination outcomes, the control path generates instructions for modifying inputs and/or generating new outputs. The data path includes a Delay Matching Queue and an Instructions Execution block. The data path executes the instructions generated by the control path. All instructions are executed, in parallel, for simultaneously manipulating multiple data flows. Since the proposed processing engine is programmable, it is much more flexible than hardware-dedicated ASIC designs and, therefore, can be adopted in SDN devices.

In one aspect, a software-defined network (SDN) processing engine is provided. The SDN processing engine includes a control path for conditional generation of programmable instructions and a data path for executing the instructions generated by the control path. The processing engine is typically configured to receive N inputs and generate M outputs in parallel. In some embodiments, content of each of the M outputs is either input content that is modified or newly generated content.

In some embodiments, the control path includes a Control Bits Extractor for extracting control bits from the N inputs, a Word Comparing Cone for comparing words of the N inputs, a multi-stage MUX/LUT Logic Cone for performing complex expressions and conditions on the control bits and outcome bits of the Word Comparing Cone, and a plurality of Instruction Tables containing instructions for data manipulation. The Control Bits Extractor, the Word Comparing Cone, the multi-stage MUX/LUT Logic Cone and/or the plurality of Instructions Tables are reconfigurable and programmable based on network features and protocols users want the processing engine to perform.

In some embodiments, the Control Bits Extractor extracts the control bits from the N inputs based on predefined formats of inputs.

In some embodiments, the Word Comparing Cone includes K configurable MUX/CMP Logic Cells. Each of the MUX/CMP Logic Cells is able to compare two W-byte words from the N inputs. Each of the MUX/CMP Logic Cells can be configured to allow only specific bits in the W bytes of each of the W-byte words are compared and/or to allow a W-byte word from one of the inputs to be compared with a constant value. In some embodiments, each of the MUX/CMP Logic Cells supports at least three operations, including equal to (==), greater than (>) and less than (<).

In some embodiments, the MUX/LUT Logic Cone includes S stages. The first stage of the S stages has input bits that includes the control bits of the N inputs to the processing engine and the output bits of the Word Comparing Cone. All output bits of stage i are input bits for stage i+1. Output bits of the last stage of the MUX/LUT Logic Cone form the indexes for reading the plurality of Instruction Tables.

In some embodiments, the stage i includes $P_i$ configurable MUX/LUT Cells. Each of the MUX/LUT Cells includes L multiplexors for selecting L arbitrary bits from input bits to that MUX/LUT Cell. The L selected bits are configured as a pointer for a lookup table cfg_LUT having $2^L$ bits. Output of the cfg_LUT is 1-bit. In some embodiments, the cfg_LUT is built from flops.

In some embodiments, a synthesis tool is be used to map complex logic expressions and conditions to the MUX/LUT Logic Cone. An example of the synthesis tool is the UC Berkeley ABC tool.

In some embodiments, the plurality of Instruction Tables include T programmable instruction tables. Outputs of the MUX/LUT logic cone form indexes which are read addresses for the T programmable instruction tables. T is at least equal to the M outputs of the processing engine such that each of the M outputs is associated with at least one of the T programmable instruction tables. In some embodiments, Table i of the T programmable instructions tables has $A_i$-bit address, wherein the Table i has up to $2^{Ai}$ entries. Each entry of Table i contains $Q_i$ instructions. In some embodiments, each of the T programmable instruction tables is built from SRAM or from arrays of flops.

In some embodiments, the processing engine supports at least two kinds of instructions including Copy instructions and ALU instructions. Each of the Copy instructions copies up to C bytes from an input to an output. Alternatively, each of the Copy instructions copies a constant value to an output. Each of the ALU instructions copies a result of an ALU operation of 2 W-byte words from inputs to an output. An input to the ALU operation can be a constant value. The ALU operation can be addition (+), subtraction (−), bitwise AND (&), bitwise OR (|), bitwise XOR (^), bitwise shift left (<<), or bitwise shift right (>>). In some embodiments, each of the Copy or ALU instructions supports bit or byte manipulation by using bitmask fields in that instruction.

In some embodiments, the data path includes a Delay Matching Queue for matching a latency of the data path to a latency of the control path such that data are processed at correct times, and an Instructions Execution block for executing all instructions produced by the control path for modifying specific inputs and/or generating new outputs.

The Delay Matching Queue can be a FIFO or a shift register with depth that is equal to the latency of the control path such that the processing engine achieves full throughput with back-to-back data processing.

In some embodiments, the Instructions Execution block includes hardware modules for executing, in parallel, all instructions produced by the control path. Each of the hardware modules executes one of the instructions.

In some embodiments, an output of the processing engine is a modification of a specific input when the initial content of the output is the content of the specific input before all instructions are executed. Alternatively, the output of the processing engine is newly generated when the initial content of the output is all zeros before all instructions are executed.

In another aspect, a method of parallel and conditional data manipulation in a software-defined network (SDN) processing engine is provided. In some embodiments, the processing engine is programmable.

The method includes receiving N inputs and flowing the N inputs through the processing engine through a control path and a data path. The method also includes simultaneously extracting control bits from the N inputs, comparing words of the N inputs, and sending the N inputs through a delay queue. The method also includes performing complex expressions and conditions on the control bits and outcomes bits from the comparison, thereby returning indexes. The method also includes, based on the indexes, retrieving instructions configured to guide how the N inputs are to be modified and how M outputs are to be generated. The method also includes executing the instructions in parallel on the N inputs, thereby generating the M outputs.

In some embodiments, contents of each of the M outputs is newly generated and/or is a modified content of one of the N inputs.

In some embodiments, the extraction, the comparison, complex expressions and conditions and instruction tables are implemented in the control path of the processing engine, and the delay queue and the execution of instructions are implemented in the data path of the processing engine.

In some embodiments, data format of each of the N inputs and the M outputs of the processing engine includes a "Length" field for identifying data size, an "Offset" field for identifying position of a first byte of a payload, a "Control" field for identifying data type, and a "Body" field for including the payload.

Figure 1:
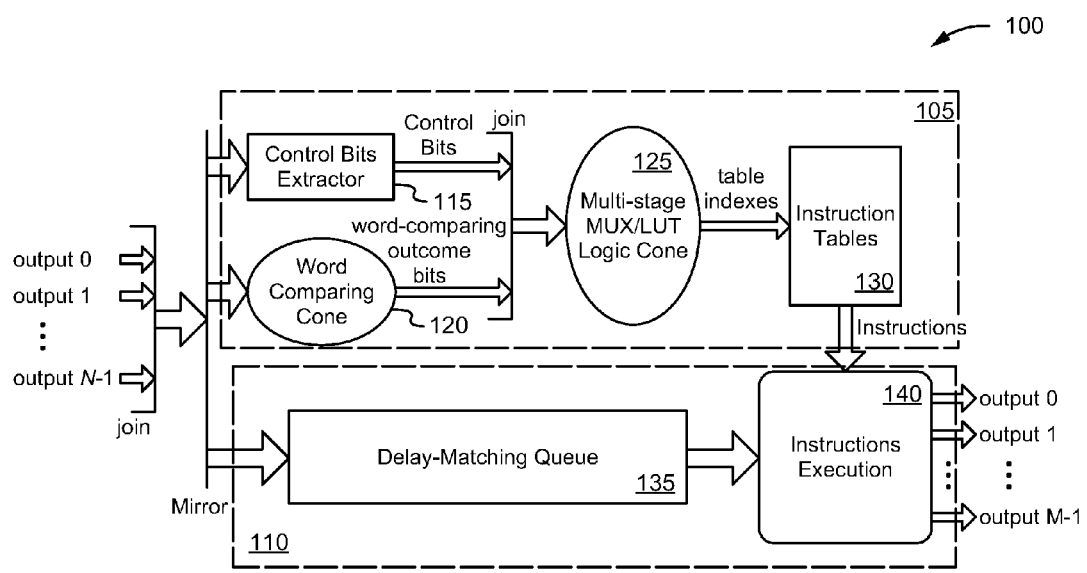
FIG. 1 illustrates a block diagram of a SDN processing engine for parallel and conditional data manipulation in a SDN system according to an embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

A software-defined networking (SDN) processing engine is proposed for parallel and conditional data manipulation. Users are able to program conditions and rules for data processing according to features and protocols which they want the SDN processing engine to support. The SDN processing engine can process, in parallel, multiple inputs and outputs at full throughput. The SDN processing engine includes two paths: a control path and a data path. The control path includes a Control Bits Extractor, a Word Comparing Cone, a multi-stage MUX/LUT Logic Cone and Instruction Tables. The control path is configured to examine whether the inputs satisfy some specific conditions of the configured network features. Based on the examination outcomes, the control path generates instructions for modifying inputs and/or generating new outputs. The data path includes a Delay Matching Queue and an Instructions Execution block. The data path is configured to execute the instructions generated by the control path. All instructions are executed, in parallel, for simultaneously manipulating multiple data flows. Since the proposed processing engine is programmable, it is much more flexible than hardware-dedicated ASIC designs and, therefore, can be adopted in SDN devices.

FIG. 1 illustrates a block diagram of a SDN processing engine 100 for parallel and conditional data manipulation in a SDN system according to an embodiment of the present invention. Data typically flows through the SDN processing engine 100 through two paths: a control path 105 and a data path 110.

The control path 105 includes a Control Bits Extractor (CBE) 115, a Word Comparing Cone (WCC) 120, a MUX/LUT Logic Cone (MLLC) 125, and Instruction Tables 130. The control path 105 is responsible for generating instructions according to conditions programmed in the cones. The term "cone" herein refers to a group of logic elements in stages which are reconfigurable for performing a variety of complex logic expressions and condition checks. In some aspects, the term "cone" can be referred to as logic "cloud". All blocks 115-130 in the control path 105 are preferably programmable.

The data path 110 includes a Delay Matching Queue 135 and an Instructions Execution block 140. The data path 110 is responsible for executing instructions produced by the control path 105 for modifying the input data and/or for generating new output data.

The SDN processing engine 100 receives N inputs and generates M outputs. Each of the M outputs of the SDN processing engine 100 can be newly generated data or can be a modified version of one of the N inputs to the SDN processing engine 100. The contents of these M outputs fully depend on how users configure and program the blocks 115-130 in the control path 105 of the SDN processing engine 100.

Figure 2:
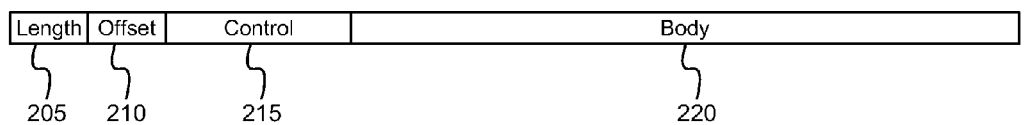
FIG. 2 illustrates a format of each data input and output of the SDN processing engine of FIG. 1 according to an embodiment of the present invention.

Since each of the N inputs and M outputs can be of a different size, the sizes are identified in a data format such that the N inputs and M outputs can be properly processed by the SDN processing engine 100. FIG. 2 illustrates a data format of each input and output data 200 of the SDN processing engine 100 according to an embodiment of the present invention. Each input and output data 200 typically includes four fields: a "Length" field 205, an "Offset" field 210, a "Control" field 215 and a "Body" field 220.

The "Length" field 205 identifies the length or size of the respective data. The size is typically in number of bytes. The "Offset" field 210 identifies the position of the first byte of the "Body" field 220 in the data. Put differently, the "Offset" field 210 identifies the size of the "Control" field 215. The "Control" field 215 contains the most important bits which identifies main features encapsulated in the data. For example, the "Control" field 215 is configured to identify the data type, such as an Ethernet frame, an IP packet, a TCP application data, or a lookup data result, or identify priority of the data. The "Body" field 220 contains the body or payload of the data.

Referring back to FIG. 1, the SDN processing engine 100 typically waits until all N inputs are available before processing so that the SDN processing engine 100 has all mutual information among the N inputs. All N inputs are joined together becoming a big chunk of data before being processed by the SDN processing engine 100.

The "Control" fields of the inputs typically contain the most important bits of the inputs. As such, these control bits are extracted by the CBE 115. All extracted control bits are further processed by the MLLC 125 in the control path 105 such that the SDN processing engine 100 will be able to decide what to do with the inputs and how to generate the outputs.

Meanwhile, all N inputs are also sent to the WCC 120. The SDN processing engine 100 performs checks at the WCC 120 whether specific words in the inputs are equal to (matched), greater than, or less than other specific words in the inputs. Word checking outcomes indicate the relationship and characteristics of the inputs which are useful for the SDN processing engine 100 to make decisions for further processing of these inputs.

Figure 3:
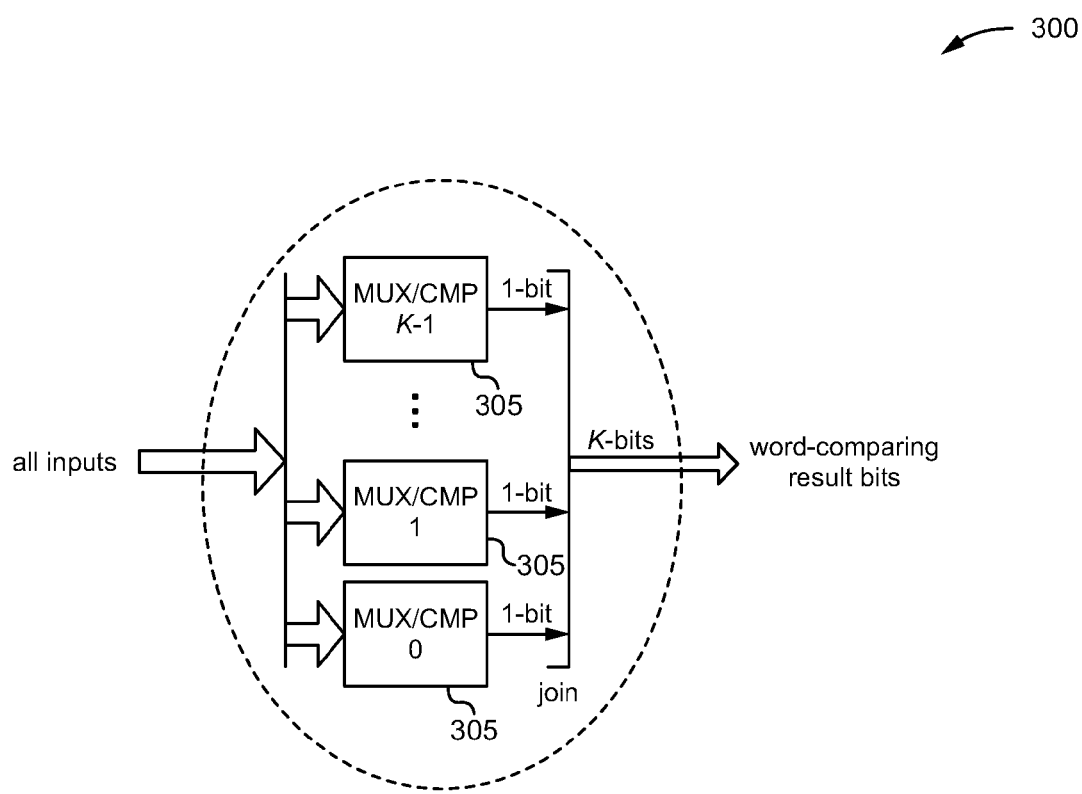
FIG. 3 illustrates a block diagram of a Word Comparing Cone according to an embodiment of the present invention.

FIG. 3 illustrates a block diagram of a Word Comparing Cone (WCC) 300 according to an embodiment of the present invention. In some embodiments, the WCC 120 of FIG. 1 is similarly configured as the WCC 300. The WCC 300 includes K reconfigurable Multiplexing/Comparing (MUX/CMP) Logic Cells 305, wherein all N inputs are sent to the MUX/CMP Logic Cells 305. Each of the MUX/CMP Logic Cells 305 is configured to perform a word comparison. The WCC 300 allows the SDN processing engine 100 to perform, in parallel, K word comparisons for the N inputs and returns K word comparing result bits.

Figure 4:
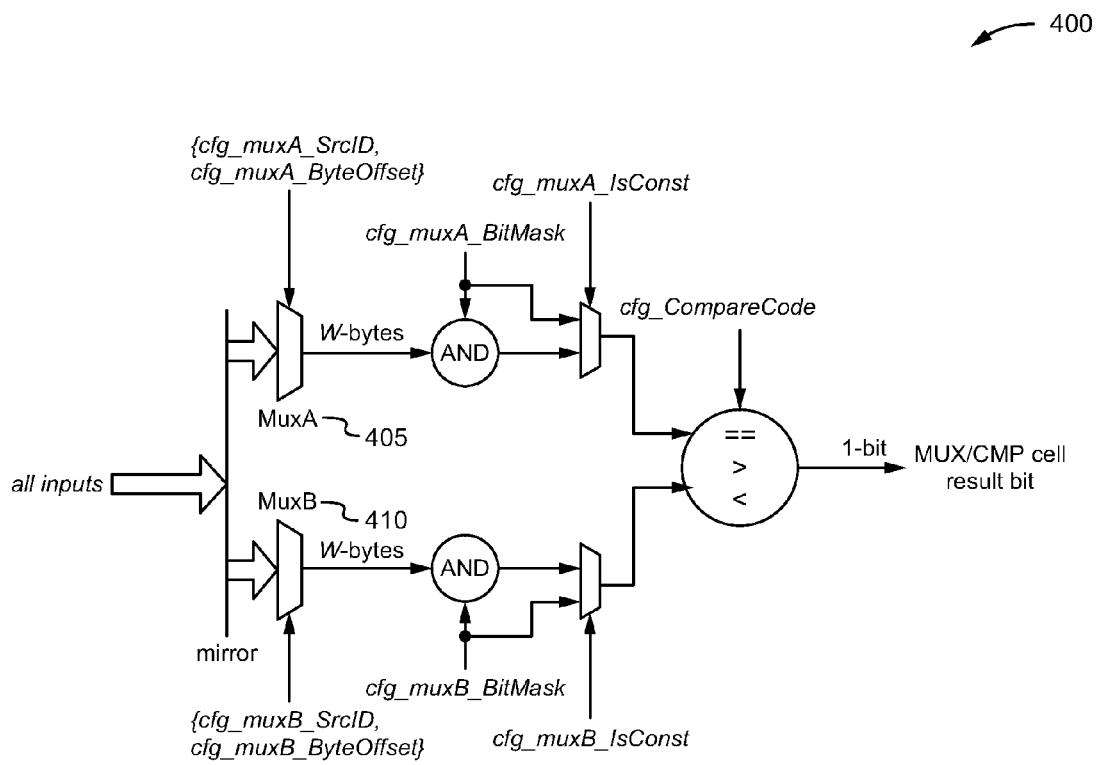
FIG. 4 illustrates a schematic of a MUX/CMP Logic Cell according to an embodiment of the present invention.

FIG. 4 illustrates a schematic of a MUX/CMP Logic Cell 400 according to an embodiment of the present invention. In some embodiments, the MUX/CMP Logic Cell 305 of FIG. 3 is similarly configured as the MUX/CMP Logic Cell 400. The MUX/CMP Logic Cell 400 is configured to compare two specific W-byte words among the N inputs. Configuration of the MUX/CMP Logic Cell 400 is preferably through its registers by software. In some embodiments, the design of the MUX/CMP Logic Cell 400 uses a plurality of registers and a plurality of multiplexors. A "cfg_muxA_SrcID" register indicates which input of N inputs is selected by MuxA 405. A "cfg_muxA_ByteOffset" register indicates the starting byte in the selected input from which the bytes will be taken. From this starting byte position, W consecutive bytes are taken from the selected input for MuxA 405. Similarly, a "cfg_muxB_SrcID" register and a "cfg_muxB_ByteOffset" register are used to take W bytes from the selected input for MuxB 410. W is typically 2 bytes (16 bits) or 4 bytes (32 bits). However, W can be another value. In some embodiments, W represents the maximum number of bytes to be taken from an input and is chosen by designers of the engine.

Typically, two selected W-byte words of MuxA 405 and MuxB 410 are compared together; however, in some instances, only specific bits in these two selected words of MuxA 405 and MuxB 410 need to be compared. Two bitmask registers, namely "cfg_muxA_BitMask" and "cfg_muxB_BitMask," can be used with the selected words if users desire to compare only specific bits in the two selected words. These two bitmask registers can also be used in the case of comparing two words having less than W bytes. For example, if W is 4, the bitmask registers can be set to compare two 4-byte words, or two 3-byte words, or two 2-byte words, or two 1-byte words from the N inputs.

Yet, in some instances, a selected word from the N inputs needs to be compared with a constant value. Two registers, namely "cfg_muxA_IsConst" and "cfg_muxB_IsConst," can be used with the bitmask registers if users desire to compare one of the two selected words with a constant value. Particularly, if "cfg_muxA_IsConst" is 1, then the "cfg_muxA_BitMask" register becomes the constant value of MuxA 405. Similarly, if "cfg_muxB_IsConst" is 1, then the "cfg_muxB_BitMask" register becomes the constant value of MuxB 410. Reusing bitmask registers for constant values advantageously reduces hardware cost for MUX/CMP Logic Cells.

A desired comparison operation of the MUX/CMP Logic Cell 400 is selected by using a "cfg_CompareCode" register. In some embodiments, three comparison operations are supported: equal to (==), greater than (>) and less than (<). The MUX/CMP Logic Cell 400 returns a 1-bit output, which indicates whether the comparing result is either true or false.

Although more or less comparison operations can be supported, different operations can be performed by simply using two MUX/CMP Logic Cells. For example, if a greater or equal to (>=) operation is needed, a first MUX/CMP Logic Cell can be used to perform the greater than operation, and a second MUX/CMP Logic Cell can be used to perform the equal to operation. The two bits that result from these two MUX/CMP Logic Cells indicate whether the comparison is true or false (i.e., 11 indicates true, while 10 and 01 both indicate false).

Referring back to FIG. 3, the K MUX/CMP Logic Cells 305 in the WCC 300 return K word comparing result bits, each of the result bits is from one of the K MUX/CMP Logic Cells 305. It should be appreciated that the more MUX/CMP Logic Cells there are in a Word Comparing Cone, the more word comparing operations can be performed in parallel but at the cost of hardware. K is typically from eight to 32. However, K can be of another value as long as K is not less than the number of inputs (e.g., N) in a SDN processing engine.

Referring back to FIG. 1, all of the extracted control bits from the CBE 115 and the K result bits from the WCC 120 are joined together and sent to the MLLC 125. The MLLC 125 is preferably configurable. The MLLC 125 checks whether specific bits in the control bits and K result bits meet some conditions of the network features configured for the SDN processing engine 100 by users. Based on the checking outcomes, the MLLC 125 is configured to drive the indexes for reading the Instruction Tables 130, which generate instructions for modifying the inputs and/or generating new outputs.

Figure 5:
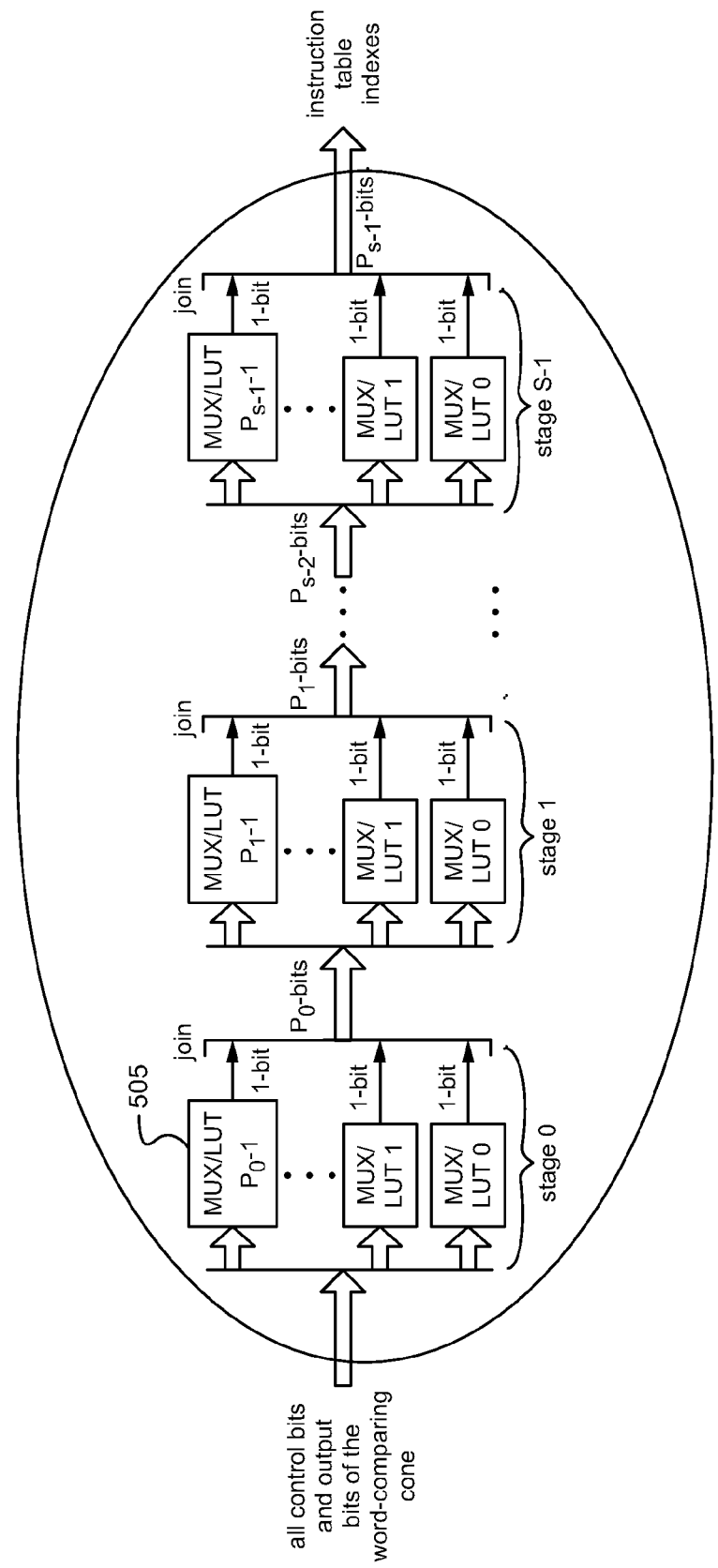
FIG. 5 illustrates a block diagram of a MUX/LUT Logic Cone according to an embodiment of the present invention.

FIG. 5 illustrates a block diagram of a MUX/LUT Logic Cone (MLLC) 500 according to an embodiment of the present invention. In some embodiments, the MLLC 125 of FIG. 1 is similarly configured as the MLLC 500. The MLLC 500 includes S stages in which stage i includes $P_i$ Multiplex/Lookup (MUX/LUT) Cells 505. Input bits for stage 0 are all control bits from a Control Bits Extractor, such as the CBE 115, and K result bits from a Word Comparing Cone 120, such as the WCC 120. Output bits for stage 0 are the input bits for stage 1. Generally, output bits of all MUX/LUT Cells in stage i are the input bits of MUX/LUT Cells in stage i+1. Output bits of the last stage form indexes which are the addresses for reading the Instruction Tables 130 of FIG. 1.

Figure 6:
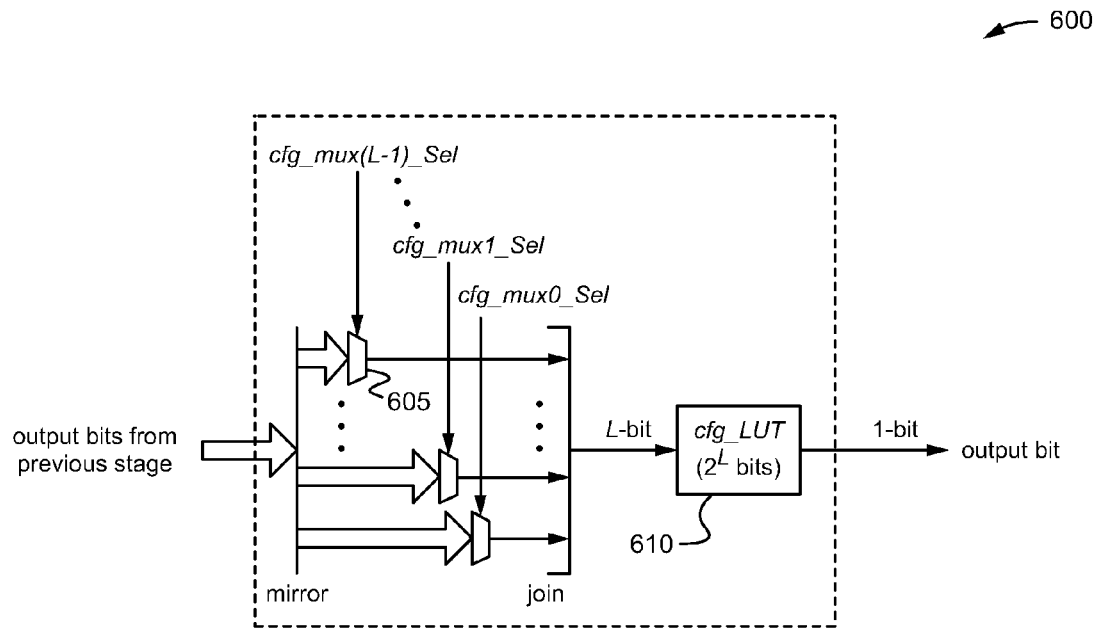
FIG. 6 illustrates a schematic of a MUX/LUT Cell according to an embodiment of the present invention.

FIG. 6 illustrates a schematic of a MUX/LUT Cell 600 according to an embodiment of the present invention. In some embodiments, the MUX/LUT Cell 505 of FIG. 5 is similarly configured as the MUX/LUT Cell 600. The MUX/LUT Cell 600 includes L multiplexors (MUXes) 605 which allow the selection of L specific bits from its input bits. These L MUXes 605 are preferably reconfigurable through L registers. The L selected bits from these L MUXes 605 form an index pointing to a reconfigurable lookup table (cfg_LUT) 610. The cfg_LUT 610 has $2^L$ bits corresponding to its L-bit index. For each input into the MUX/LUT cell 600, only one result bit is returned by the cfg_LUT 610. In some embodiments, the cfg_LUT 610 is built from flops because the cfg_LUT 610 typically has small number of entries, and each entry is only 1 bit.

The MUX/LUT Cell 600 is configured to perform any Boolean expression of L bits selected from its input bits. For example, assume (1) L is 3, (2) three selected bits are a, b and c, and (3) the Boolean expression X=(a & b|c) is to be checked. X is 1 if both a and b are 1, or if c is 1. If a, b and c are three bits of an index I, then X is 1 if I equals to $110_{(2)}$=6, $111_{(2)}$=7, $001_{(2)}$=1, $011_{(2)}$=3 or $101_{(2)}$=5. So, the 8-bit cfg_LUT is programmed as $11101010_{(2)}$.

Referring back to FIG. 5, since each stage in the MLLC 500 includes a plurality of MUX/LUT Cells 505, each stage is able to perform, in parallel, checking several Boolean expressions of input bits. And, since the MLLC 500 includes a plurality of stages, the MLLC 500 is able to check, in parallel, complicated expressions. Each stage in the MLLC 500 can include the same or different number of MUX/LUT Cells 505.

It should be appreciated that the more MUXes there are in a MUX/LUT Cell, the more MUX/LUT Cells there are in a stage, and/or the more stages there are in the MLLC, the stronger the checking capacity of a SDN processing engine is but at the cost of hardware. A MUX/LUT Cell typically has four to six MUXes, a stage typically has 32 to 128 MUX/LUT cells, and the MLLC 500 typically has three to six stages. However, more or less MUXes in a MUX/LUT Cell is possible. More or less MUX/LUT Cells in a stage is also possible. Similarly, more or less stages in the MLLC is possible.

To program the MLLC 125 of FIG. 1 to perform specific expressions and conditions, a synthesis tool can be used to map these expressions to the logic cone structures. For example, the open-source named ABC developed by scientists at University of California at Berkeley can be used to map expressions and conditions representing several network profiles and protocols (such as Ethernet, VLAN, routing, bridging, iVIF, ACL lookups) to the MLLC 125.

The MLLC 125 returns instruction table indexes for reading the Instruction Tables 130. These table indexes are outcomes of conditions and expressions programmed in the logic cones per each group of inputs. For different inputs, the table indexes outputted by the MLLC 125 could be different. As a result, different instructions would be returned by the Instruction Tables 130. These instructions are configured to guide how the inputs to the SDN processing engine 100 are to be modified and how outputs are to be generated in the data path 110 of the SDN processing engine 100.

The SDN processing engine 100 is equipped with T instruction tables. Since the SDN processing engine 100 has M outputs, T must be at least equal to M so that each of the M outputs is associated with at least one table. An output of the SDN processing engine 100 can be associated with multiple instruction tables, but no single table can belong to two or more outputs. Assigning instruction tables to each output port in an SDN processing engine is a design option chosen by designers of the SDN processing engine.

Figure 7:
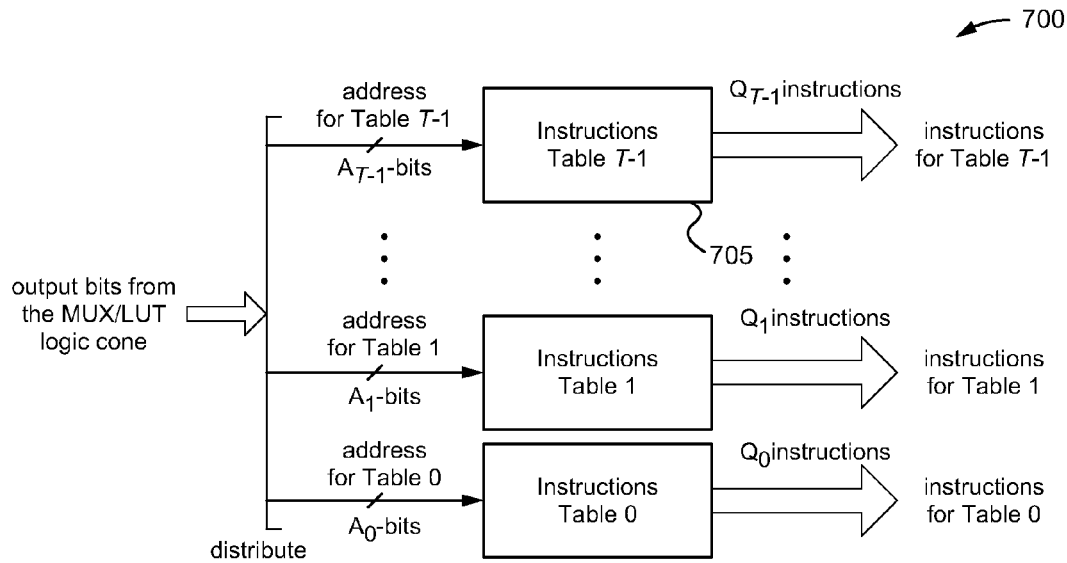
FIG. 7 illustrates a block diagram of Instruction Tables according to an embodiment of the present invention.

FIG. 7 illustrates a block diagram of Instruction Tables 700 according to an embodiment of the present invention. In some embodiments, the Instruction Tables 130 of FIG. 1 are similarly configured as the Instruction Tables 700. The read address of each table 705 is taken from the output bits of a MLLC, such as the MLLC 125. Table i has $A_i$-bit address which means that Table i has up to $2^{A_i}$ entries. It should be appreciated that the more entries there are in the table 705, the more flexible the engine is to manipulate the corresponding output data but at the cost of hardware. The number of entries of the table 705 is typically from 16 to 256 which means the address width of the table 705 is from 4 to 8 bits. However, more or less entries in the table 705 is possible. In some embodiments, the tables 705 are built from SRAM memories or from arrays of flops.

Each entry of Table i contains $Q_i$ instructions; hence Table i will return $Q_i$ instructions for each cycle in which the input data are available. All these $Q_i$ instructions are executed in parallel in the data path of the SDN processing engine to generate an output j which is associated to Table i.

All instructions are executed in parallel in the data path. It should be appreciated that the more instructions per entry there are in a table, the more data manipulation operations for each output can be executed in parallel but at the cost of hardware. For an output which is modified from an input, the number of instructions per each entry of its corresponding table is typically from four to eight. For an output which is newly generated, the number of instructions per entry of its corresponding table is typically from eight to 16.

Referring back to FIG. 1, all instructions returned by the Instruction Tables 130 are sent to the Instructions Execution block 140 in the data path 110, which executes all these instructions in parallel. Before instructions are executed in the data path 110, all N inputs into the SDN processing engine 100 go through the Delay Matching Queue 135 for matching with the delay of the control path 105. The Delay Matching Queue 110 can be a FIFO or a shift register with depth that is equal to the latency of the control path 105 such that the instructions from the control path 105 are received at the right time with the corresponding delayed inputs. In addition, the Delay Matching Queue 135 guarantees the SDN processing engine 100 achieves full throughput with back-to-back data on input ports.

In some embodiments, two kinds of instructions are supported by the SDN processing engine 100: Copy instructions, and ALU instructions. The Copy instruction performs copying specific bytes from an input and pasting them to a specific position in an output. The ALU instruction takes two specific words from inputs, and then performs an ALU operation, and finally pastes the ALU result to a specific position in an output. Although two kinds of instructions are supported by the SDN processing engine 100, more or less instructions can be supported by the SDN processing engine 100.

Figure 8A:
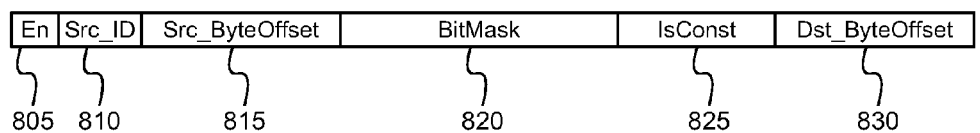
FIG. 8A illustrates a format of a Copy instruction according to an embodiment of the present invention.
Figure 8B:
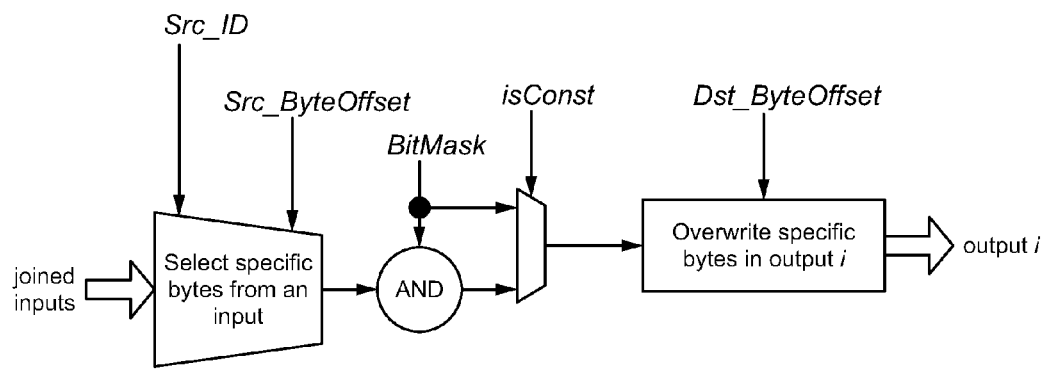
FIG. 8B illustrates a schematic implementing the Copy instruction of FIG. 8A according to an embodiment of the present invention.

FIG. 8A illustrates a format of a Copy instruction 800 according to an embodiment of the present invention. FIG. 8B illustrates a schematic implementing the Copy instruction 800 according to an embodiment of the present invention. Typically, the hardware design 850 executes the Copy instruction 800 in the SDN processing engine's data path 110.

An "En" field 805 indicates whether this instruction is executed or not. If the instruction is enabled (bit "En" is 1), then a "Src_ID" field 810 is used to select one input among inputs. A "Src_ByteOffset" field 815 points to the first byte position in the selected input where a maximum of C bytes are copied. In some embodiments, C is between 4 bytes and 8 bytes. A "BitMask" field 820 is used to mask specific bits in the copied bytes. This allows users to perform copying less than C bytes or copying bits in addition to copying the entire C bytes. The Copy instruction 800 also allows copying a constant value by setting a "IsConst" field 805 to 1. In this case, the constant value is given by the "BitMask" field 820. Finally, the copied-and-masked bytes or the constant bytes are pasted to the destination output. They overwrite the bytes in the corresponding output at the starting position given by the "Dst_ByteOffset" field 830.

Figures 9A, 9B:
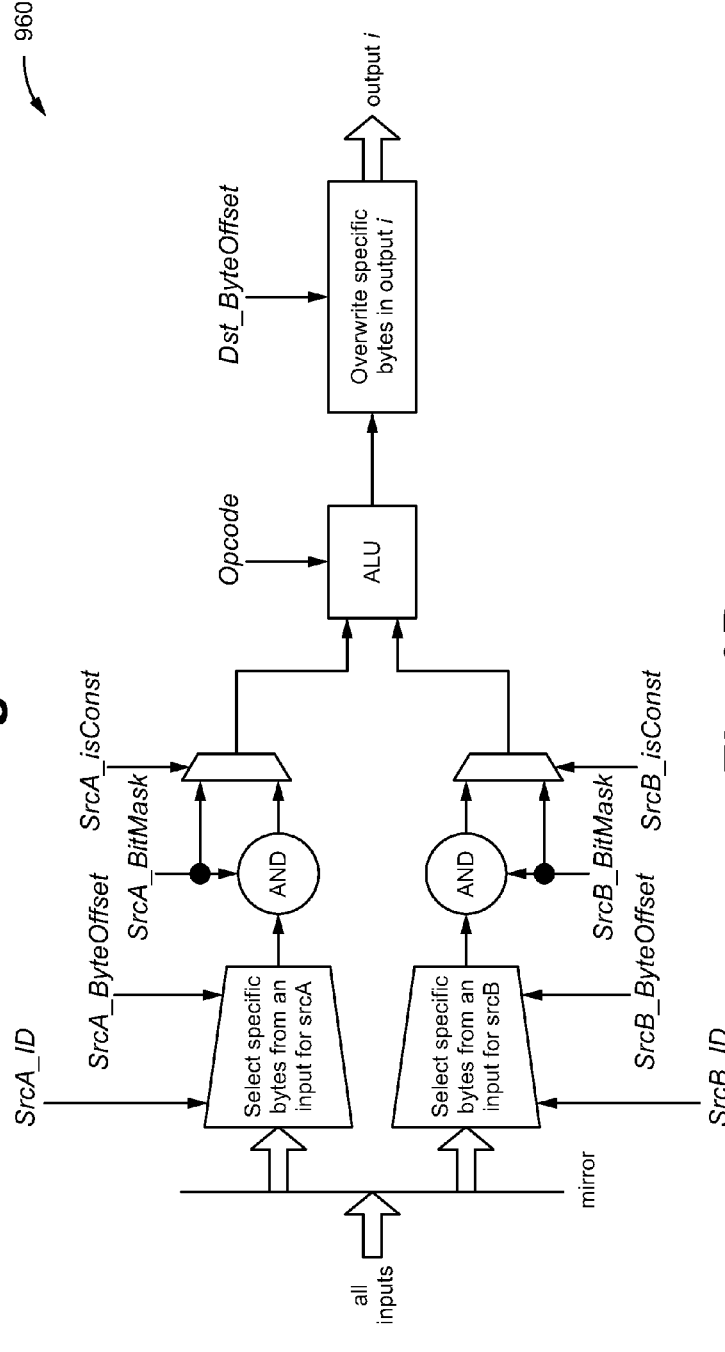
FIG. 9A illustrates a format of an ALU instruction according to an embodiment of the present invention.
FIG. 9B illustrates a schematic implementing the ALU instruction of FIG. 9A according to an embodiment of the present invention.

FIG. 9A illustrates a format of an ALU instruction 900 according to an embodiment of the present invention. FIG. 9B illustrates a schematic implementing the ALU instruction 900 according to an embodiment of the present invention. Typically, the hardware design 960 executes the ALU instruction 900 in the SDN processing engine's data path 110.

An "En" field 905 indicates whether this instruction is executed or not. Similar to the Copy instruction 800, a "SrcA_ID" field 915, a "SrcA_ByteOffset" field 920 and a "SrcA_BitMask" field 925 are used to copy and mask up to W bytes from an input for srcA. A "SrcB_ID" field 935, a "SrcB_ByteOffset" field 940 and a "SrcB_BitMask" field 945 are used to copy and mask up to W bytes from an input for srcB. Users can also assign constant values for srcA or srcB. If a "SrcA_IsConst" field 930 is set to 1, srcA has constant value equal to the value set in the "SrcA_BitMask" field 925. If a "SrcB_IsConst" field 950 is set to 1, srcB has constant value equal to the value set in the "SrcB_BitMask" field 915. The number of copied bytes W is predefined depending on the supported bitwidth of the ALU. W is typically 2 bytes (16 bits) or 4 bytes (32 bits). However, W can be another value.

The copied bytes or constant values for srcA and srcB become two input operands of an ALU. The operation of ALU is chosen by an "OpCode" field 910. The most useful operations for a SDN processing engine are: addition (+), subtract (−), bitwise AND (&), bitwise OR (|), bitwise XOR (^), bitwise shift left (<<), and bitwise shift right (>>). An ALU instruction is also used as a Copy instruction by configuring the operation as addition or bitwise OR of a source with zero. The ALU result is then pasted to the destination output at the starting byte position given by the "Dst_ByteOffset" field 955.

An output is a modification of a specific input if its initial content is the content of that input before all instructions are executed. An output is newly generated if its initial content is all zeros before all instructions are executed.

Each output has its own instruction tables; and, each instruction table returns multiple instructions. All these instructions are executed in parallel to build the corresponding output. In a SDN system, Copy operations are used more frequently than ALU operations. In addition, ALU instructions are more complex hence have more hardware cost than Copy instructions. Accordingly, each table entry typically has only one to two ALU instructions, and the rest are Copy instructions to achieve the most cost-efficient design.

Embodiments of the present invention relate to fast and conditional data modification and generation in a software-defined network (SDN) processing engine. Modification of multiple inputs and generation of multiple outputs can be performed in parallel. A size of each input or output data can be large, such as in hundreds of bytes. The processing engine includes a control path and a data path. The control path generates instructions for modifying inputs and generating new outputs. The data path executes all instructions produced by the control path. The processing engine is typically programmable such that conditions and rules for data modification and generation can be reconfigured depending on network features and protocols supported by the processing engine. The SDN processing engine allows for processing multiple large-size data flows and is efficient in manipulating such data. The SDN processing engine achieves full throughput with multiple back-to-back input and output data flows.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A software-defined network (SDN) processing engine comprising:
   a non-transitory computer readable memory;
   a control path including a Word Comparing Cone for comparing words of N inputs for conditional selection of programmable instructions stored on the memory, wherein the Word Comparing Cone includes K configurable multiplexer/comparator (MUX/CMP) Logic Cells that are each for comparing two W-byte words from the N inputs to each other; and
   a data path for executing the instructions selected by the control path,
   wherein the processing engine is configured to receive the N inputs and generate M outputs in parallel, wherein the N inputs are received from outside the SDN processing engine.

2. The software-defined network (SDN) processing engine of claim 1, wherein content of each of the M outputs is one of input content that is modified or newly generated content.

3. The software-defined network (SDN) processing engine of claim 1, wherein the control path includes:
   a Control Bits Extractor for extracting control bits from the N inputs;
   a multi-stage multiplexer/lookup table (MUX/LUT) Logic Cone for performing expressions and conditions on the control bits and outcome bits of the Word Comparing Cone; and
   a plurality of Instruction Tables containing instructions for data manipulation.

4. The software-defined network (SDN) processing engine of claim 3, wherein at least one of the Control Bits Extractor, the Word Comparing Cone, the multi-stage MUX/LUT Logic Cone and the plurality of Instructions Tables is reconfigurable and programmable based on network features and protocols.

5. The software-defined network (SDN) processing engine of claim 3, wherein the Control Bits Extractor extracts the control bits from the N inputs based on pre-defined formats of inputs.

6. The software-defined network (SDN) processing engine of claim 1, wherein only specific bits in the W bytes of each of the W-byte words are compared.

7. The software-defined network (SDN) processing engine of claim 1, wherein each of the MUX/CMP Logic Cells is for comparing one W-byte word from one of the inputs with a constant value.

8. The software-defined network (SDN) processing engine of claim 1, wherein each of the MUX/CMP Logic Cells supports at least three operations, wherein the three operations are equal to (==), greater than (>) and less than (<).

9. The software-defined network (SDN) processing engine of claim 3, wherein the MUX/LUT Logic Cone includes S stages, wherein
   a first stage of the S stages has input bits that includes the control bits of the N inputs to the processing engine and the outcome bits of the Word Comparing Cone,
   all output bits of stage i are input bits for stage i+1, and output bits of a last stage of the S stages form indexes for reading the plurality of Instruction Tables.

10. The software-defined network (SDN) processing engine of claim 9, wherein the stage i includes $P_i$ configurable MUX/LUT Cells.

11. The software-defined network (SDN) processing engine of claim 10, wherein each of the MUX/LUT Cells includes L multiplexers for selecting L arbitrary bits from input bits to that MUX/LUT Cell.

12. The software-defined network (SDN) processing engine of claim 11, wherein the L selected bits are configured as a pointer for a lookup table cfg_LUT having $2^L$ bits, and wherein output of the cfg_LUT is 1-bit.

13. The software-defined network (SDN) processing engine of claim 12, wherein the cfg_LUT is built from flops.

14. The software-defined network (SDN) processing engine of claim 3, wherein a synthesis tool is to be used to map logic expressions and conditions to the MUX/LUT Logic Cone.

15. The software-defined network (SDN) processing engine of claim 3, wherein the plurality of Instruction Tables include T programmable instruction tables, and wherein outputs of the MUX/LUT Logic Cone form indexes which are read addresses for the T programmable instruction tables, and wherein T is at least equal to the M outputs of the processing engine such that each of the M outputs is associated with at least one of the T programmable instruction tables.

16. The software-defined network (SDN) processing engine of claim 15, wherein Table i of the T programmable instructions tables has $A_i$-bit address, wherein the Table i has up to $2^{Ai}$ entries.

17. The software-defined network (SDN) processing engine of claim 16, wherein each entry of Table i contains $Q_i$, instructions.

18. The software-defined network (SDN) processing engine of claim 15, wherein each of the T programmable instruction tables is built from SRAM or from arrays of flops.

19. The software-defined network (SDN) processing engine of claim 1, wherein the processing engine supports at least two kinds of instructions including Copy instructions and ALU instructions.

20. The software-defined network (SDN) processing engine of claim 19, wherein the Copy instruction copies up to C bytes from an input to an output.

21. The software-defined network (SDN) processing engine of claim 19, wherein the Copy instruction copies a constant value to an output.

22. The software-defined network (SDN) processing engine of claim 19, wherein the ALU instruction copies a result of an ALU operation of 2 W-byte words from inputs to an output.

23. The software-defined network (SDN) processing engine of claim 22, wherein an input to the ALU operation is a constant value.

24. The software-defined network (SDN) processing engine of claim 23, wherein the ALU operation is one of addition (+), subtraction (−), bitwise AND (&), bitwise OR (|), bitwise XOR (^), bitwise shift left (<<), and bitwise shift right (>>).

25. The software-defined network (SDN) processing engine of claim 19, wherein each of the Copy or ALU instructions supports bit or byte manipulation by using bitmask fields in that instruction.

26. The software-defined network (SDN) processing engine of claim 1, wherein the data path includes:

a Delay Matching Queue for matching a latency of the data path to a latency of the control path such that data are processed at correct times; and an Instructions Execution block for executing all instructions produced by the control path for modifying specific inputs or generating new outputs.

27. The software-defined network (SDN) processing engine of claim 26, wherein the Delay Matching Queue is one of a FIFO and a shift register with depth that is equal to the latency of the control path such that the processing engine achieves full throughput with back-to-back data processing.

28. The software-defined network (SDN) processing engine of claim 26, wherein the Instructions Execution block includes hardware modules for executing, in parallel, all instructions produced by the control path, wherein each of the hardware modules executes one of the instructions.

29. The software-defined network (SDN) processing engine of claim 26, wherein an output is a modification of a specific input when initial content of the output is the content of the specific input before all instructions are executed, and wherein the output is newly generated when the initial content of the output is all zeros before all instructions are executed.

30. A method of parallel and conditional data manipulation in a software-defined network (SDN) processing engine, the method comprising:

receiving N inputs, wherein N is greater than 1;

flowing the N inputs through the processing engine through a control path and a data path;

extracting control bits from a plurality of the N inputs simultaneously, comparing words of the N inputs to each other;

performing expressions and conditions on the control bits and outcome bits from the comparison, thereby returning indexes;

based on the indexes, retrieving instructions configured to guide how the N inputs are to be modified and how M outputs are to be generated; and executing the instructions in parallel on the N inputs, thereby generating the M outputs.

31. The method of claim 30, wherein the extraction, the comparison, the expressions and conditions and instruction tables are implemented in the control path of the processing engine, and the execution of instructions are implemented in the data path of the processing engine.

32. The method of claim 30, wherein content of each of the M outputs is newly generated and/or is a modified content of one of the N inputs.

33. The method of claim 30, wherein data format of each of the N inputs and the M outputs of the processing engine includes:

a "Length" field for identifying data size;

an "Offset" field for identifying position of a first byte of a payload;

a "Control" field for identifying data type; and a "Body" field for including the payload.

* * * * *